(12) United States Patent
Glass et al.

(10) Patent No.: US 11,600,933 B2
(45) Date of Patent: Mar. 7, 2023

(54) ASSEMBLY FOR THE ELECTRICAL CONNECTION OF TWO COMPONENTS

(71) Applicant: BorgWarner Inc., Auburn Hills, MI (US)

(72) Inventors: Thomas Glass, Rockenhausen (DE); Kai Homann, Mainz (DE)

(73) Assignee: BorgWarner Inc., Auburn Hills, MI (US)

( * ) Notice: Subject to any disclaimer, the term of this patent is extended or adjusted under 35 U.S.C. 154(b) by 531 days.

(21) Appl. No.: 16/682,768

(22) Filed: Nov. 13, 2019

(65) Prior Publication Data
US 2020/0161778 A1    May 21, 2020

(30) Foreign Application Priority Data

Nov. 16, 2018   (EP) ...................................... 18206844

(51) Int. Cl.
*H01R 4/02*          (2006.01)
*H02K 11/28*        (2016.01)
(Continued)

(52) U.S. Cl.
CPC ............. *H01R 4/026* (2013.01); *B60R 16/03* (2013.01); *F02B 37/04* (2013.01); *F02B 39/10* (2013.01);
(Continued)

(58) Field of Classification Search
CPC .......... H01R 4/026; H01R 4/26; H01R 13/64; H01R 13/642; H01R 13/6456;
(Continued)

(56) References Cited

U.S. PATENT DOCUMENTS 3,281,760 A * 10/1966 Oshima ................ H01R 13/633
                                                                              439/686
4,580,862 A *  4/1986 Johnson ................. H01R 24/52
                                                                              439/585
(Continued)

FOREIGN PATENT DOCUMENTS

DE            625428 C       2/1936
DE          4041782 A1      6/1992
(Continued)

OTHER PUBLICATIONS

English language abstract and machine-assisted English translation for DE 625 428 extracted from espacenet.com database on Nov. 20, 2019, 4 pages.

(Continued)

*Primary Examiner* — Oscar C Jimenez
(74) *Attorney, Agent, or Firm* — Howard & Howard Attorneys PLLC

(57) ABSTRACT

An assembly (2) is described for the electrical connection of two components, in particular of a power electronics switch (58) to an electric motor (56) of a charging device (48), wherein a first component (24) has a first contact element (4) made from a conductive material and formed along a longitudinal axis (6) and designed with an outer surface (8) at least partially surrounding the longitudinal axis (6), and a second component (30) has a second contact element (14) made from a conductive material and is designed with a cavity (18) formed along the longitudinal axis (6), whose inner surface (20) corresponds to the outer surface (8) of the first contact element (4), wherein either the inner surface (20) of the second contact element (14) or the outer surface (8) of the first contact element (4) is provided with a profile (22) which has a plurality of projecting elements, wherein the inner surface (20) and the outer surface (8) are selected with respect to their lateral dimensions such that the pro- (Continued)

Figure 1A:
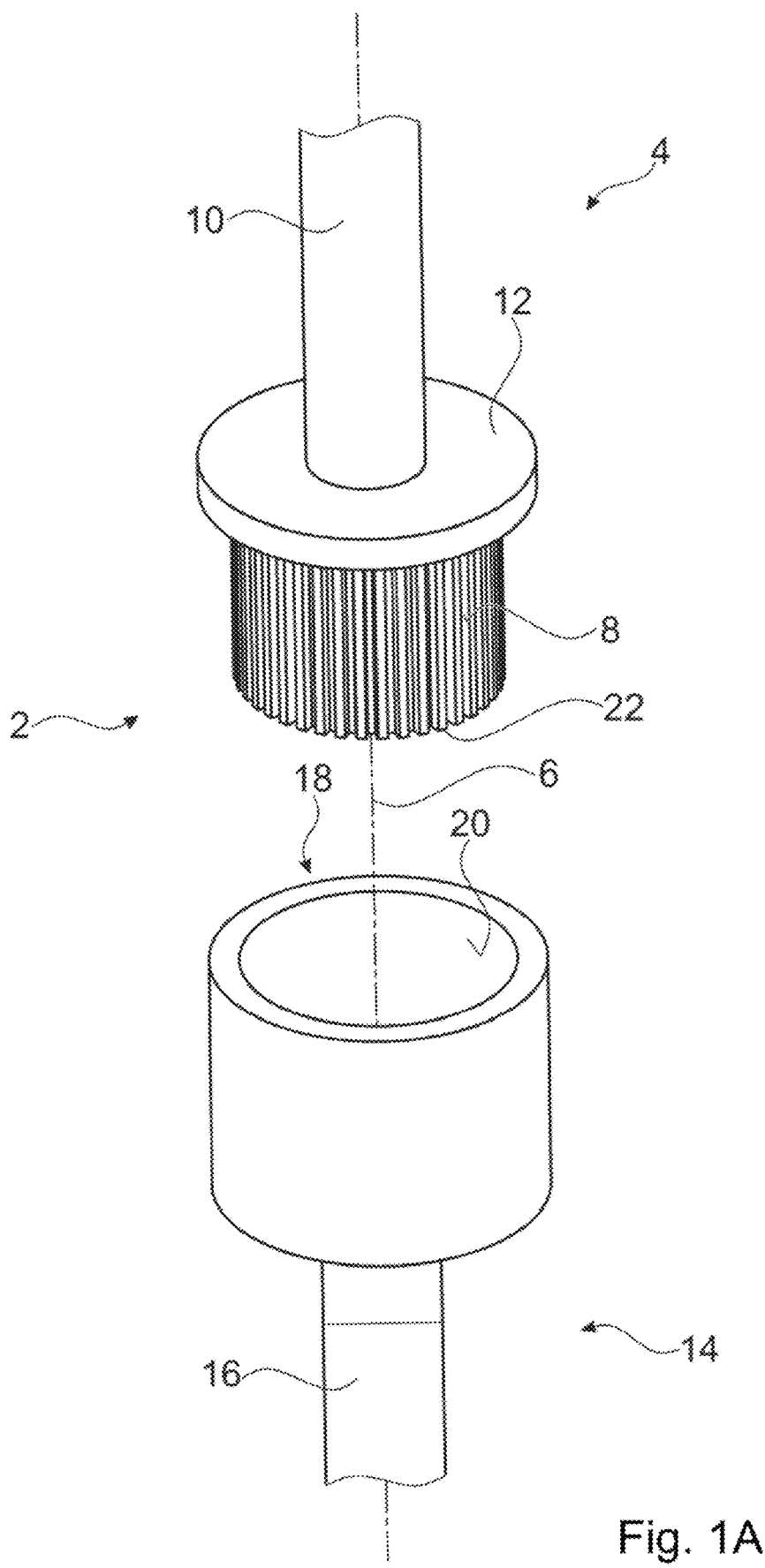

jecting elements of the profile (22) penetrate in an area close to the surface during insertion of the first contact element (4) into the second contact element (14).

15 Claims, 7 Drawing Sheets

(51) Int. Cl.
*B60R 16/03* (2006.01)
*F02B 37/04* (2006.01)
*F02B 39/10* (2006.01)
*H01M 8/04111* (2016.01)
*H01R 4/26* (2006.01)

(52) U.S. Cl.
CPC ........... *H01M 8/04111* (2013.01); *H01R 4/26* (2013.01); *H02K 11/28* (2016.01)

(58) Field of Classification Search
CPC ......... H02K 11/28; B60R 16/03; F02B 37/04; F02B 39/10; H01M 8/04111
See application file for complete search history.

(56) References Cited

U.S. PATENT DOCUMENTS

| | | | | |
|---|---|---|---|---|
| 4,932,902 A | * | 6/1990 | Crane, Jr. | H01R 24/28 439/627 |
| 8,956,485 B2 | * | 2/2015 | Florian | H01L 41/273 156/89.12 |
| 9,906,102 B2 | | 2/2018 | Hippen et al. | |
| 2006/0079108 A1 | | 4/2006 | McCoy | |
| 2006/0272843 A1 | * | 12/2006 | Berghofer | H01R 4/024 174/94 R |
| 2009/0186518 A1 | * | 7/2009 | Chadbourne | H01R 4/203 439/485 |
| 2014/0246783 A1 | | 9/2014 | Nishizawa et al. | |

FOREIGN PATENT DOCUMENTS

| | | |
|---|---|---|
| DE | 102015102270 A1 | 9/2015 |
| EP | 0484392 B1 | 1/1998 |
| EP | 2903024 A1 | 8/2015 |
| EP | 2952758 A1 | 12/2015 |
| GB | 2251345 B | 8/1994 |
| WO | 9313908 A1 | 7/1993 |

OTHER PUBLICATIONS

English language abstract for DE 40 41 782 extracted from espacenet.com database on Nov. 20, 2019, 1 page.

English language abstract for DE 10 2015 102 270 extracted from espacenet.com database on Nov. 20, 2019, 2 pages.

* cited by examiner

ASSEMBLY FOR THE ELECTRICAL CONNECTION OF TWO COMPONENTS

CROSS-REFERENCE TO RELATED APPLICATIONS

This application claims the benefit of European Patent Application No. 18206844.5 filed Nov. 16, 2018 the disclosure of which is herein incorporated by reference in its entirety.

The invention relates to an assembly for the electrical connection of two components, a power electronics switch comprising an electric motor and a charging device.

Charging devices are known from the general prior art in the form of exhaust gas turbochargers, in which a turbine wheel drives a compressor wheel of a compressor. The turbine wheel and compressor wheel are arranged on a mutual rotor, which is rotatably guided in a bearing housing. The turbine wheel is driven by an exhaust gas flow. The compressor is arranged in an intake manifold of an internal combustion engine.

Charging devices are additionally known, in which the drive of the compressor wheel is not carried out by means of the turbine wheel, but instead by means of an electric motor.

A device of this type is known, for example, from EP 2 952 758 A2. The charging device for an internal combustion engine, in particular for a vehicle, described therein comprises a compressor with a compressor housing and a compressor wheel arranged in a compressor chamber, an electric motor with a rotor and a stator, a motor housing with a motor chamber for accommodating the rotor and the stator, and a connection from the compressor chamber into the motor chamber in order to facilitate a pressure compensation between the compressor chamber and the motor chamber.

In addition, charging devices are known, in which a mechanical turbocharger with a turbine wheel and compressor wheel is supplemented by an additional compressor wheel, which is driven by means of an electric motor.

Furthermore, charging devices are also used in fuel cells for a fluid supply, i.e., for air supply of the fuel cell.

In these embodiments, electric components must often also be connected to the charging device, whose installation should also be possible in narrow available spaces.

For threaded connection between tubular parts, EP 0 484 392 B1 indicates that an axial conical external and internal thread of the two parts are provided with regular turns, wherein the threads of the two parts are paired with a press fit between them inside of one runout of the external thread. A fluid sealing of the threaded connection includes an engagement of the nose portion of the external thread part within the internal thread part. The external thread extends into the nose portion, wherein a fluid-tight engagement of the external and internal threads is present, which includes a press fit between the external and internal threads in the nose portion to an extent that is sufficient to essentially maintain the seal against fluid leakage at the nose portion, even when the connection is subjected to internal or, optionally, external fluid pressure, and that the press fit between the external and internal thread is sufficient at the runout of the external thread to essentially maintain a threaded engagement at the runout, while the connection is subjected to the so-called fluid pressure and axial draw corresponding to the yield strength of the tubular body.

A method is known from WO 93/13908 A1 for securing two bodies which are held in end-face contact, against lateral movement, in order to thus establish a connection between the two bodies. The method includes a relative lateral movement of the two surfaces to promote 'galling' between them, wherein the galling binds the surfaces against additional movements of this type, and an electric current is passed across the connection during and/or after the formation of an adhesively-bonded connection. If the current is provided during the formation of the connection, then the external supplied mechanical energy is supplemented by the electrical energy, in order to selectively heat and soften the contacting irregularities, so that these may deform and flatten out more quickly in order to bring smaller irregularities in the vicinity into contact and thus to increase the number of gall points. A gall-promoting substance may be inserted between the connection surfaces during the formation of the connection.

Arising from the prior art, it is thus the object of the invention to create an assembly for the electrical connection of two components, by means of which a simple installation is possible for electronic components on or in a charging device for an internal combustion engine or for a fuel cell.

This problem is solved by independent patent claim 1. Additional advantageous embodiments of the invention are the subject matter of the subclaims. These may be combined with each other in technologically sensible ways. The description, in particular in conjunction with the drawing, additionally characterizes and specifies the invention.

According to the invention, an assembly for the electrical connection of two components is created, in particular of a power electronics switch to an electric motor of a charging device, wherein a first component has a first contact element formed along a longitudinal axis and designed with an outer surface at least partially surrounding the longitudinal axis, and a second component has a second contact element, which is designed with a cavity formed along the longitudinal axis, whose inner surface corresponds to the outer surface of the first contact element, wherein either the inner surface of the second contact element or the outer surface of the first contact element is provided with a profile which has a plurality of projecting elements, wherein the inner surface and the outer surface are selected with respect to their lateral dimensions such that the projecting elements of the profile penetrate in an area close to the surface during insertion of the first contact element into the second contact element.

Correspondingly, the assembly has two contact elements, for which a profile on one of the two contact elements ensures a penetration into an area close to the surface. This penetration generates a plurality of local electrical contacts, so that an electrical connection is suited for transferring larger currents by means of the assembly. Therefore, the two contact elements must merely be guided together with respect to their correspondingly configured surfaces for the assembly, so that a mechanically stable connection is also established, which may also be carried out with respect to each other based on the displacement along the longitudinal axis if, for example, no direct visual contact exists for an installer during the assembly. The insertion of the two components with respect to their inner and outer surfaces may therefore be carried out blindly, wherein the corresponding surfaces may also be shaped so that a self-aligning assembly is possible. For this purpose, for example, the outer surface may be slanted, for example, at its end facing the inner surface. The profile is advantageously arranged on the outer surface of the first contact element so that this may be generated, for example, in the shape of a regular toothing by means of a cold-rolling process, after the first contact element has been produced.

The first contact element and the second contact element are formed from an electrically conductive material, wherein a metal material is typically used. A penetration, for example into an oxide layer, optionally formed on the surface of the metal, may be carried out within the area close to the surface. By joining the components, a reliable electrical connection is therefore established.

The first contact element and the second contact element are preferably formed with a symmetrical cross section along the longitudinal axis, in particular are formed with a cylindrical or rectangular cross section. It is possible, in particular in the case of a cylindrical cross section, to carry out the first contact element and the second contact element as turned parts which are easy to produce.

According to another embodiment of the invention, a guide pin is additionally provided on a tip of the first contact element or of the second contact element in order to facilitate the insertion of the contact elements, in that the guide pin engages in a corresponding guide opening at the other contact element.

This approach facilitates the installation of the assembly in difficult to reach areas, so that an adjustment of the two contact elements to each other may be carried out by means of the guide pin.

Furthermore, it is particularly provided, both in the first component and also in the second component, to arrange the contact elements in an insulator which may separate the current-carrying contact elements from other elements of the components. The insulator may thereby form an outer surface of the components.

Furthermore, a plurality of contact elements may be provided both in the first and also in the second component.

It is therefore possible to create a plurality of electrical connections by means of the assembly according to the invention.

In addition, a charging device for an internal combustion engine or for a fuel cell, in particular in a vehicle, is specified, wherein the charging device has a compressor with a compressor housing and a compression chamber, in which a compressor wheel is arranged, an electric motor with a motor housing, and a power electronics switch, arranged in an accommodation space adjacent to the motor housing, for controlling the electric motor, wherein an assembly as described above is provided for the electrical connection to the power electronics switch and/or to the electric motor.

The assembly for the electrical connection may thereby be provided within the power electronics switch.

Alternatively or additionally, the assembly may be provided for the electrical connection between the power electronics switch and the electric motor.

Figure 1B:
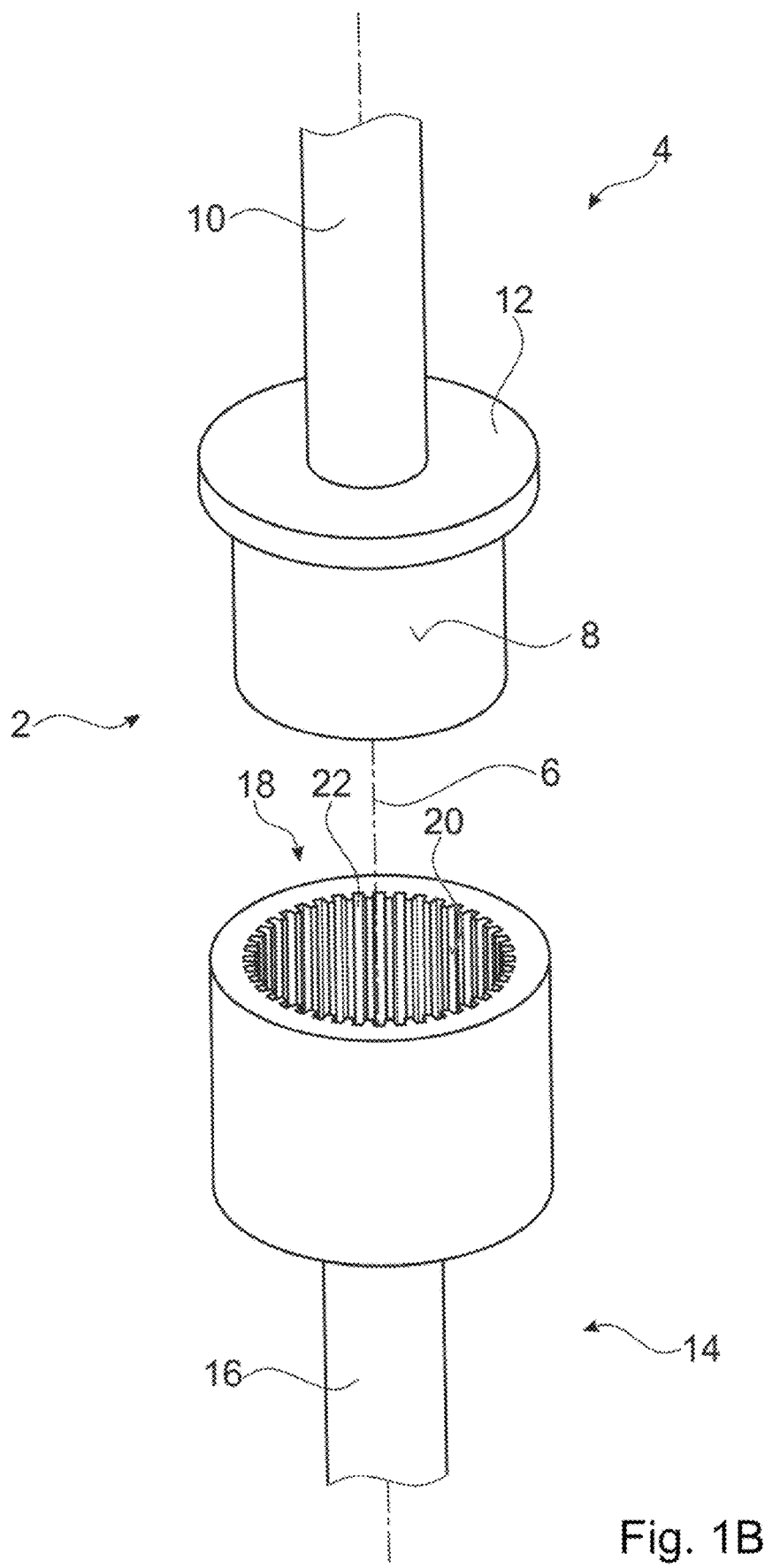
Figure 2:
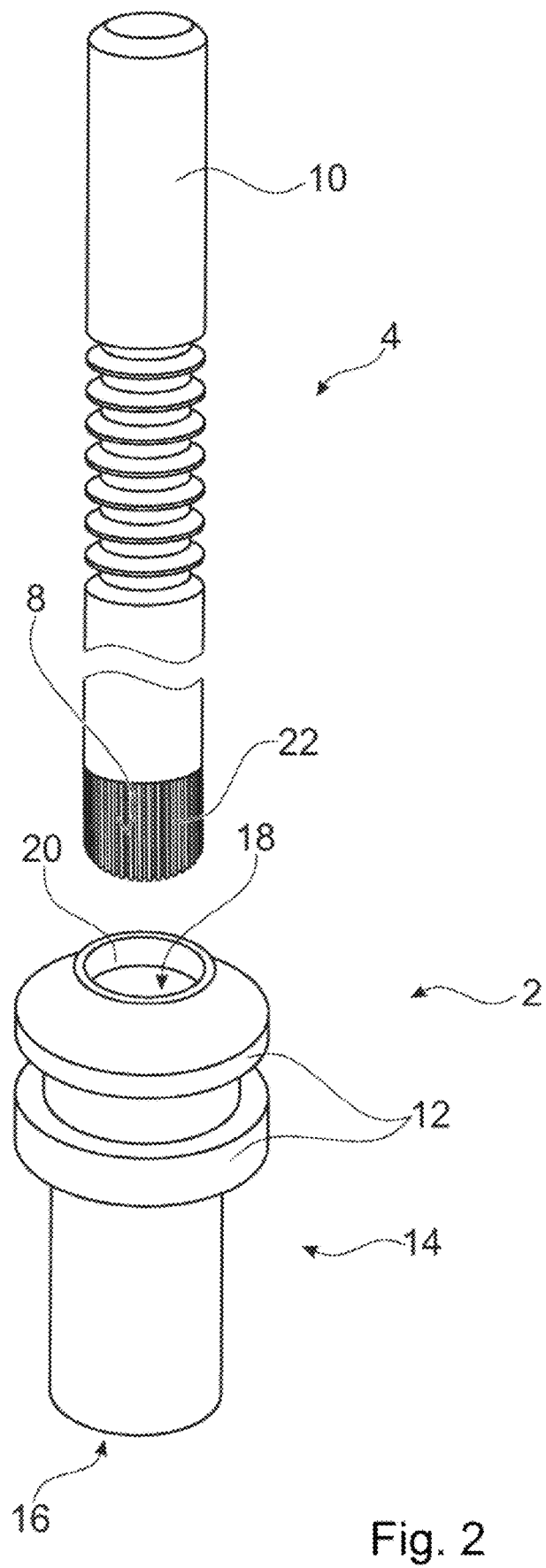
Figure 3:
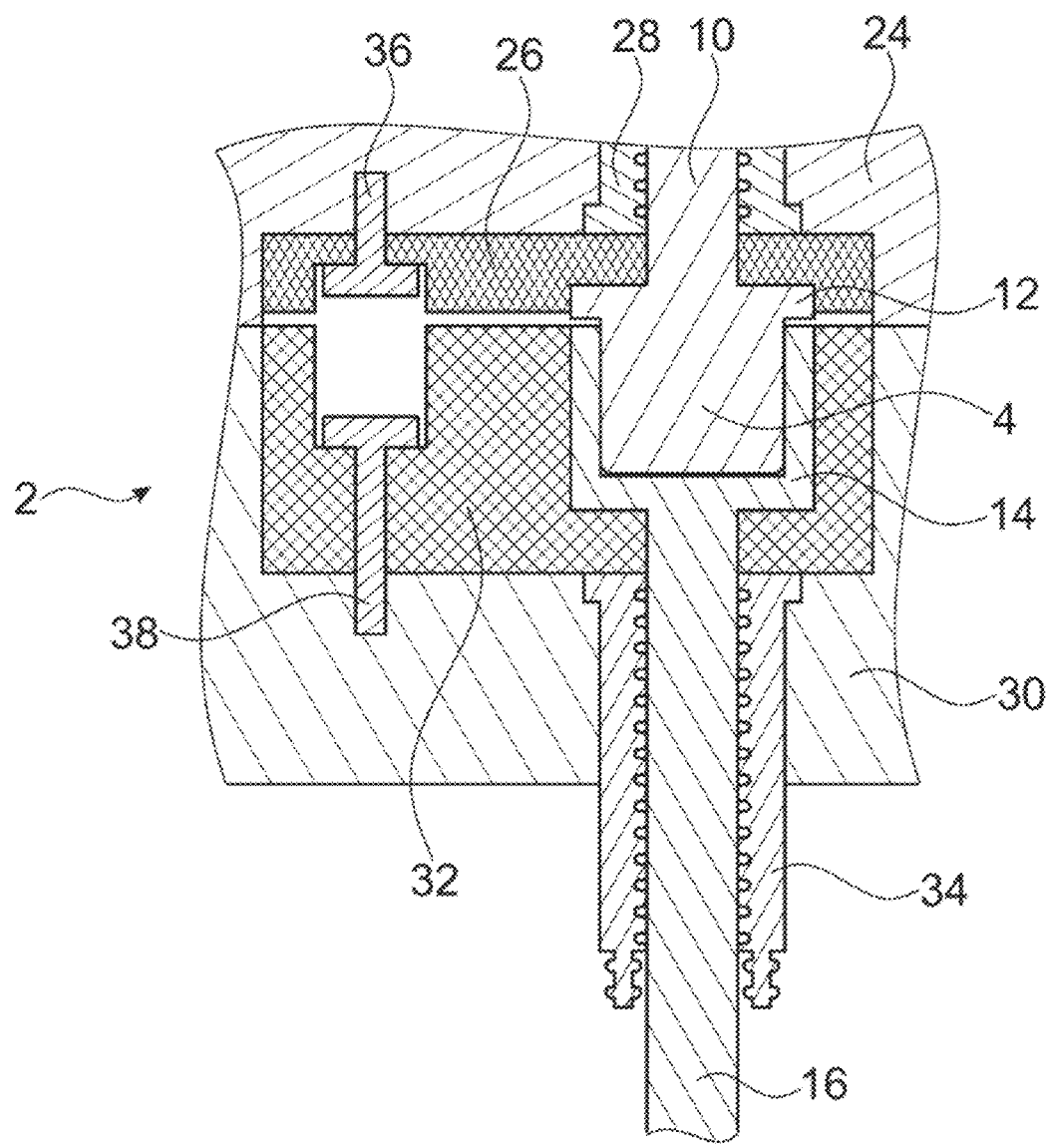
Figure 4:
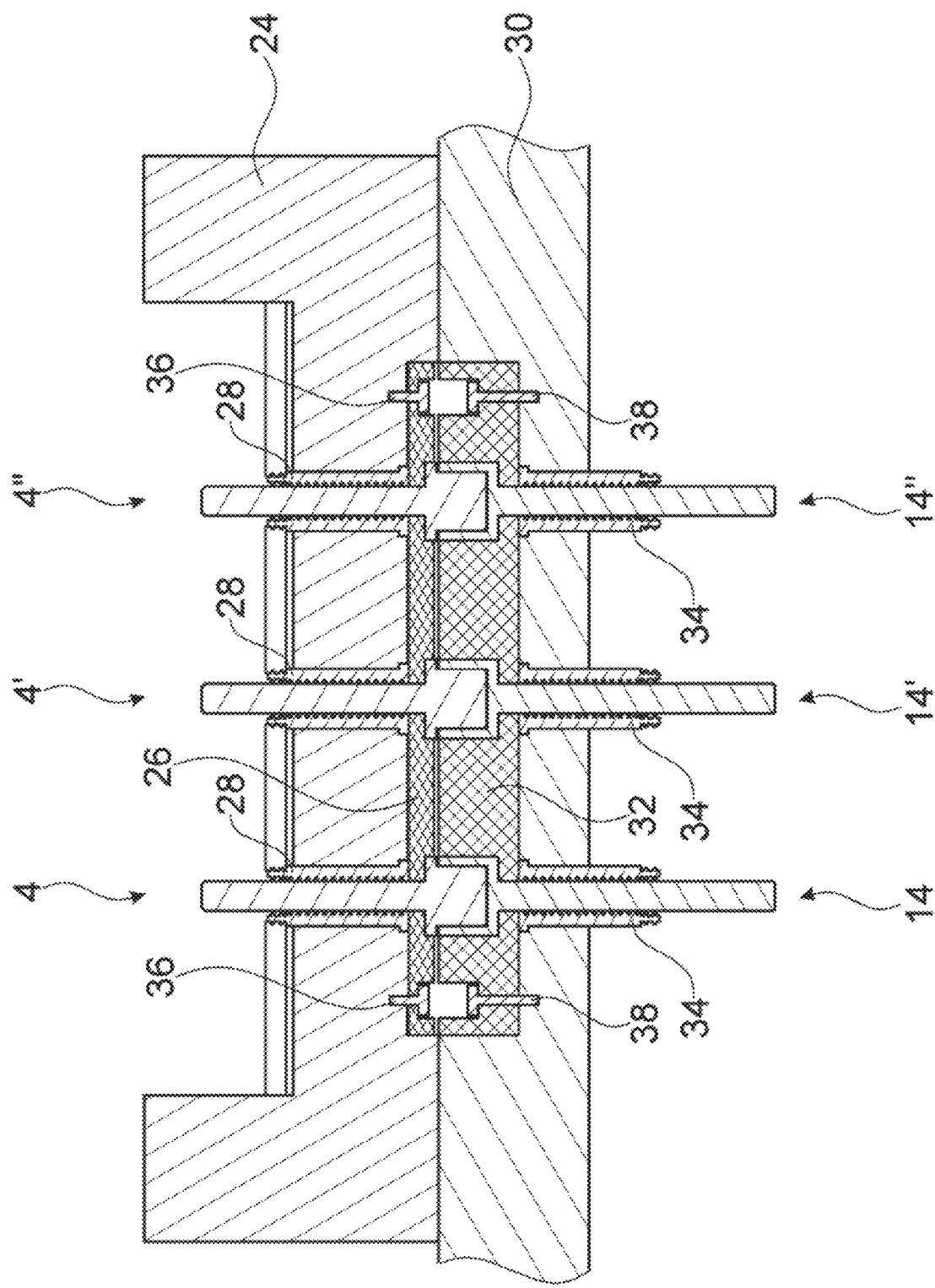
Figure 5:
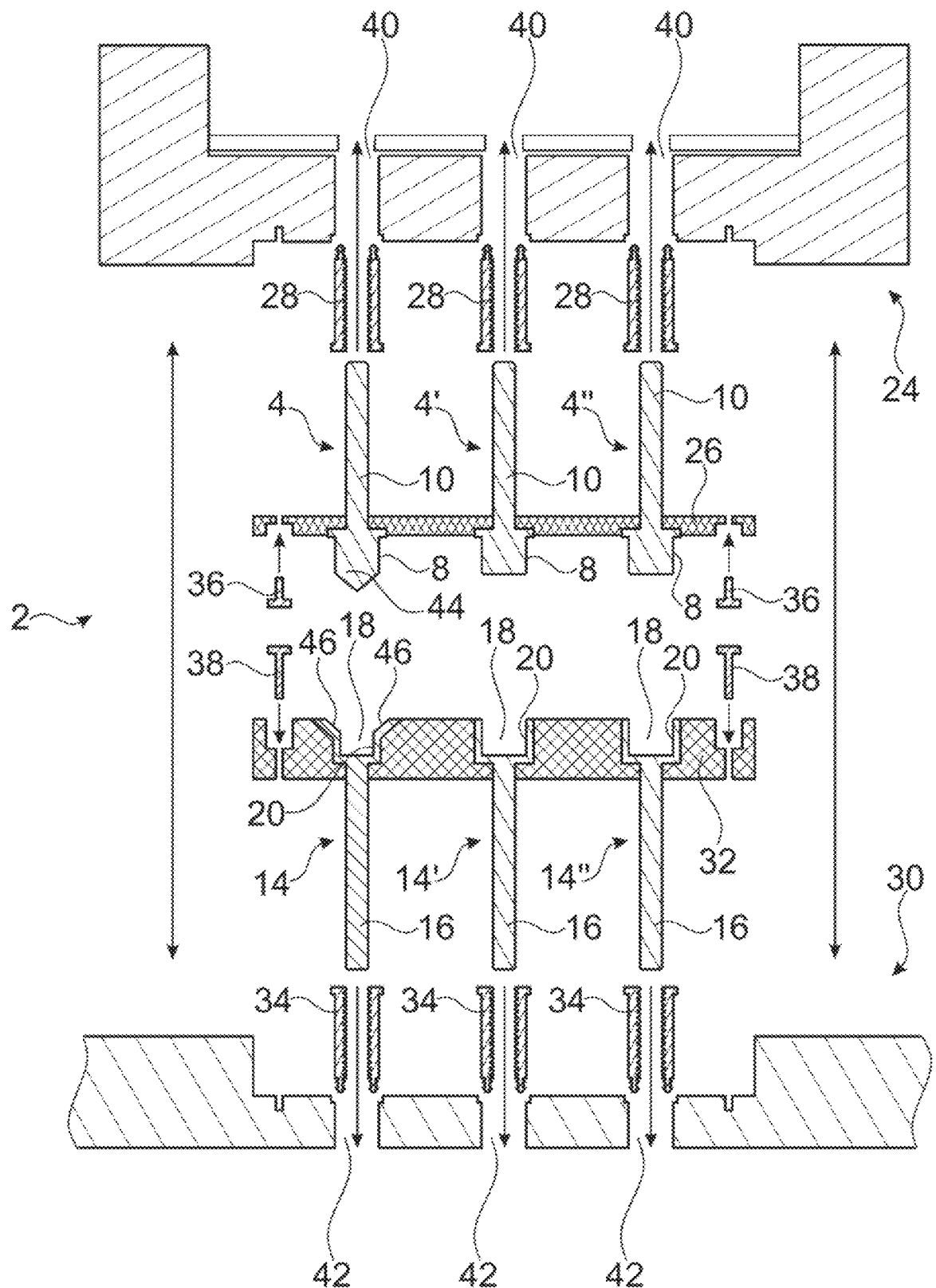
Figure 6:
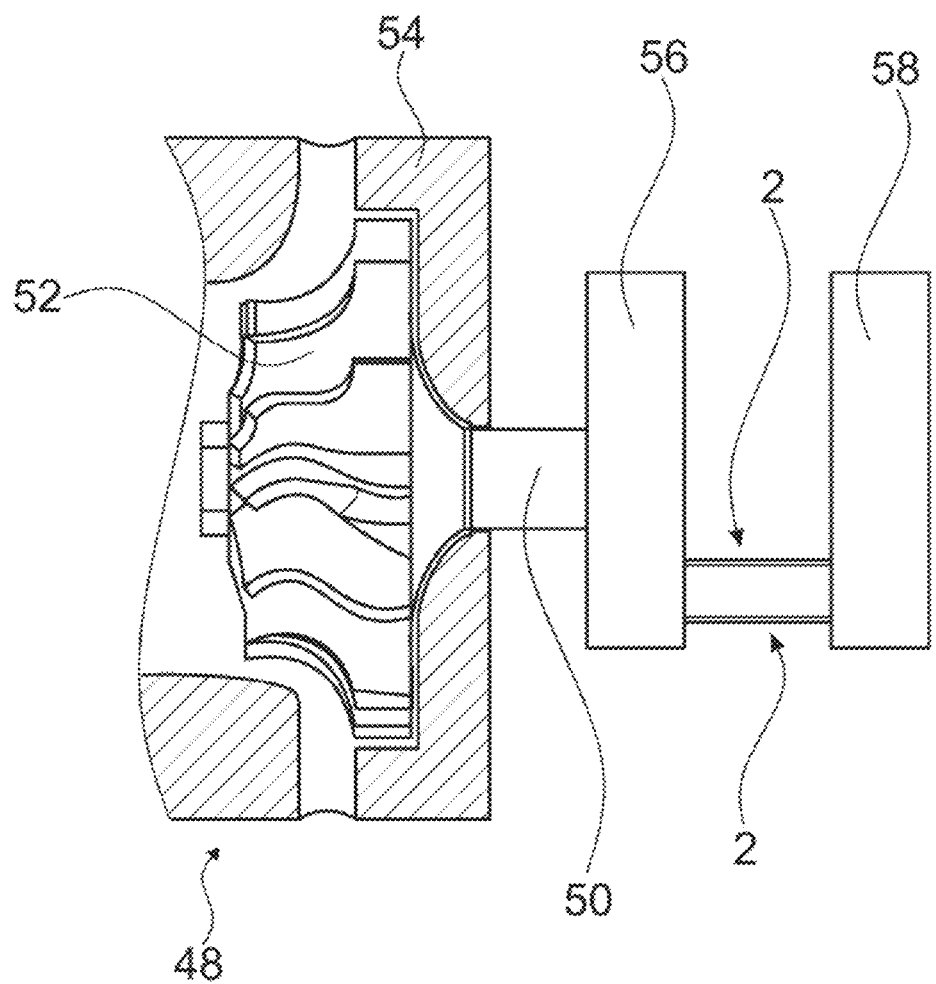

A few exemplary embodiments will be subsequently explained in greater detail by way of the drawing. As shown in:

FIG. 1A a first contact element together with a second contact element as components of a first assembly according to the invention in a perspective side view, FIG. 1B a first contact element together with a second contact element as components of another assembly according to the invention in a perspective side view, FIG. 2 a first contact element together with a second contact element as components of another assembly according to the invention in a perspective side view, FIG. 3 an assembly according to the invention in a sectional view according to a first exemplary embodiment, FIG. 4 an assembly according to the invention in a sectional view according to a second exemplary embodiment, FIG. 5 the assembly from FIG. 4 in an exploded view to explain the assembling, and FIG. 6 a schematic assembly according to the invention together with a charging device in a sectional view.

In the figures, identical or functionally identically acting components are provided with identical reference numerals.

A first embodiment of an assembly 2 according to the invention for electrically connecting two components will subsequently be described in greater detail with reference to FIG. 1A. Assembly 2 comprises a first contact element 4, which is designed essentially rotationally symmetrical to a longitudinal axis 6. First contact element 4 has a cylindrical outer surface 8 in the example shown, which is delimited at a first terminal 10 by an annular collar 12. Instead of a completely encircling annular collar, a configuration may be selected in which a plurality of circular segments are formed and in which individual radial projections are provided.

A second contact element 14 is likewise designed essentially rotationally symmetrical along longitudinal axis 6, wherein a cylindrical cavity 18 is formed on an end opposite a second terminal 16, which cavity is delimited about the longitudinal axis by an inner surface 20. A stop is created above annular collar 12 by joining first contact element 4 and second contact element 14 together.

First terminal 10 and second terminal 16 are designed as electrical conductors in the embodiment according to FIG. 1A. Potentially additionally present eyelets, bushings, terminal lugs and the like are known to the person skilled in the art and would correspondingly be provided as needed.

The dimensioning of inner surface 20 and the dimensioning of outer surface 8 are thereby selected so that first contact element 4 and second contact element 14 may interengage with respect to corresponding outer surface 8 and inner surface 20, so that an electrical connection may be established between first terminal 10 and second terminal 16.

First contact element 4 and second contact element 14 are formed in FIG. 1A with round cross sections, wherein a square, rectangular, or differently shaped cross section, for example, is possible in other embodiments.

One special feature of assembly 2 consists in that either inner surface 20 of second contact element 14 or outer surface 8 of first contact element 4 is provided with a profile 22 which is indicated in FIG. 1A by a plurality of grooves formed along longitudinal axis 6.

An embodiment should preferably be selected in which profile 22 is only formed on outer surface 8 of first contact element 4, as this is shown in FIG. 1A.

A variant, in which profile 22 is formed on inner surface 20 of second contact element 14, is shown in FIG. 1B.

Profile 22 according to FIG. 1A or 1B is configured such that first contact element 4 is provided on outer surface 8 with a plurality of projecting elements, which were generated, for example, by means of a cold-rolling process. Accordingly, profile 22 is designed as a regular toothing, wherein the height of the radially projecting elements is selected so that, upon inserting first contact element 4 into second contact element 14, the projecting elements of profile 22 penetrate into an area close to the surface in said second contact element. This may be, e.g., an oxide layer on metallic inner surface 20 of second contact element 14, wherein the height of the projecting elements leads to a local bonding at inner surface 20 and outer surface 8 during the insertion. Upon detaching first contact element 4 from second contact element 14, the local bonding is separated by breaking away.

This type of approach is often described in the technology using the English term 'galling' or the German term 'cold welding'.

In this way, it is possible to establish an inexpensive electrical connection, which additionally enables a high current flow. Furthermore, this type of assembly 2 easily provides the requirements with respect to component tolerances to be maintained, and also provides, in addition to an electrical connection, a mechanical connection which includes good stability during vibrations, which is particularly important in vehicle technology when used on motors. In contrast to sometimes delicate plug socket structures, the risk of degradation of the electrical connection during assembling is minimal, so that the components provided with assembly 2 may even be joined without a line of sight by a user, so that an easy assembly of two components is possible.

Another embodiment of assembly 2 according to the invention is shown in FIG. 2.

Assembly 2 again has first contact element 4, which is designed as essentially rotationally symmetrical. First contact element 4 has, in the embodiment shown, a cylindrical outer surface 8, which is formed with an essentially constant diameter up to first terminal 10. Outer surface 8 of first contact element 4 is provided with a profile 22 which is indicated in FIG. 2 by a plurality of grooves formed along the longitudinal axis.

Second contact element 14 is likewise designed essentially rotationally symmetrical, wherein cylindrical cavity 18 is formed on an end opposite second terminal 16, which cavity is delimited about the longitudinal axis by inner surface 20.

The dimensioning of inner surface 20 and the dimensioning of outer surface 8 are thereby selected so that first contact element 4 and second contact element 14 may interengage with respect to corresponding outer surface 8 and inner surface 20, so that an electrical connection may be established between first terminal 10 and second terminal 16 by means of cold welding. Second terminal 16 is designed as a hollow cylindrical bush in the example shown, in whose interior an electrical conductor may be attached, for example, by soldering or crimping. Second contact element 14 has in this case encircling collar 12 which, in contrast to the embodiments according to FIGS. 1A and 1B, does not function as a stop during joining of first terminal 10 and second terminal 16, but instead is used as a retaining element during the embedding of second contact element 14 into an insulating plastic element (not shown in FIG. 2).

FIG. 3 shows another embodiment of assembly 2 according to the invention. The depiction in FIG. 3 is selected as a sectional view, wherein first contact element 4 is inserted into a first component 24. For this purpose, it is provided that first contact element 4 is delimited in the area of collar 12 by an insulator 26, which is penetrated by first terminal 10. First terminal 10 may likewise be enclosed by an electrically-insulating, cylindrical seal 28. A similar approach is selected with respect to the fixing of second contact element 14. In this case, a second component 30 is provided on its upper side with a second insulator 32, which accommodates the end of second contact element 14 opposite second terminal 16, so that corresponding inner surface 20 and outer surface 8 may be joined. A second cylindrical seal 34 is arranged in turn between second component 30 and second terminal 16. The fixing of first insulator 26 in first component 24 may be carried out, for example, by means of a screw 36. Analogously, the fixing of second insulator 32 in second component 30 may be carried out using a second screw 38. It is naturally possible to also use other connection technologies, known to the person skilled in the art, wherein gluing would also be possible in addition to a screw connection.

It is clear in the depiction according to FIG. 3, that a simple electrical and mechanical connection is established between first component 24 and second component 30 by means of first contact element 4 and second contact element 14, wherein, due to the configuration of first contact element 4 with a cylindrical outer surface 8, a mechanically stable accommodation is carried out in the cavity delimited by inner surface 20 so that the mutual assembly of the two components 24 and 30 may be carried out at a relatively late time in the manufacturing process.

The approach to the electrical connection of two components depicted in FIG. 3 is subsequently expanded to a plurality of electrical terminals with reference to FIG. 4. It is clear that additional first contact elements 4' and 4" are formed, which engage in corresponding second contact elements 14' and 14". The remaining elements are selected to be identical to the depiction in FIG. 3, so that reference is analogously made to the above explanations. Based on this approach, an electrical contact of a plurality of terminals 10, 10', 10" to second terminals 16, 16', 16" may be carried out in an easy way, which additionally may accommodate high currents and is also suited for high voltages based on the insulating characteristics of both insulators 26 and 32 and also of seals 34 and 28.

The assembling of assembly 2 is subsequently explained in greater detail with reference to FIG. 5. Initially, first component 24 is provided, into which a first seal 28 is respectively inserted at corresponding first openings 40. For each first opening 40 on first insulator 26, a corresponding number of first contact elements 4 is inserted so that first insulator 26 with first contact elements 4 may subsequently be guided into first seals 28 and fixed in first component 24 by means of first screws 38. The fixing of second contact element 14 in second insulator 32 is carried out in a similar way, wherein again second seals 34 are respectively inserted into corresponding openings 42 in second component 30 so that the corresponding number of second contact elements 14 is likewise guided into second seals 34 and is fixed on second insulator 32 by means of second screws 38. First component 24 is subsequently joined to second component 30, so that now assembly 2 is formed, as it was already depicted in FIG. 4. Based on the combined electrical and mechanical connections, it is possible to install electric components, for example, on charging devices, at a very late time in the manufacturing sequence, so that electronic components and mechanical components may each be producible in themselves and, as sealed units, may be connected to each other via the two contact elements 4 and 14.

In the case of the pair, made of first contact element 4 and second contact element 14, located farthest to the left in FIG. 5, additional guide aids are indicated, which should facilitate the joining of first component 24 with second component 30. For this purpose, first contact element 4 additionally has a guide pin 44 on its tip. Furthermore, second contact element 14 is provided with a guide opening 46, in order to facilitate the insertion of contact elements 4 and 14 into each other, in that guide pin 44 engages into corresponding guide opening 46 on the other contact element. Guide pin 44 and guide opening 46 are thereby each designed as oblique surfaces, so that in the case of a deviation of the positioning of one of contact elements 4 and 14 from longitudinal axis 6, a centering is carried out with respect to longitudinal axis 6.

This measure may also be carried out for the other embodiments for individual or for all contact elements 4 and 14. It is likewise possible to solely provide guide pin 44 or only guide opening 46.

It has been shown to be particularly advantageous that the approach, presented in conjunction with FIGS. 1 to 5, is to be used in a charging device in which a compressor wheel is driven by an electric motor. In addition, the assembly according to one of FIGS. 1 to 5 may be used both for connecting individual components of the power electronics system to each other and also for connecting to an electric motor.

This will be explained again in greater detail in conjunction with FIG. 6. A charging device 48 is shown in FIG. 6, which is depicted only schematically in a sectional view. Charging device 48 has a compressor wheel 52 provided with a shaft 50 and arranged within a compressor housing 54. Shaft 50 is driven in rotation by electric motor 56, wherein a power electronics switch 58 is provided to control electric motor 56 and is connected to electric motor 56 with the aid of assembly 2 according to the invention. Alternatively or additionally, assembly 2 according to the invention may also be used internally in power electronics switch 58 or at other points within the scope of charging device 48.

Charging device 48 may be used both alone and also in combination with a mechanical turbocharger comprising a turbine wheel and a compressor wheel in the intake manifold of an internal combustion engine, wherein it is likewise possible to use charging device 48 in other applications, for example, for the air supply of a fuel cell.

The features previously indicated and listed in the claims and gatherable from the figures are advantageously implementable both individually and also in various combinations. The invention is not limited to the exemplary embodiments described, but instead may be modified in many ways within the context of expert ability.

LIST OF REFERENCE NUMERALS

2 Assembly
4 First contact element
6 Longitudinal axis
8 Outer surface
10 First terminal
12 Collar
14 Second contact element
16 Second terminal
18 Cavity
20 Inner surface
22 Profile
24 First component
26 First insulator
28 First seal
30 Second component
32 Second insulator
34 Second seal
36, 38 First, second screw
40, 42 First, second opening
44 Guide tip
46 Guide opening
48 Charging device
50 Shaft
52 Compressor wheel
54 Compressor housing
56 Electric motor
58 Power electronic unit

The invention claimed is:

1. An assembly for the electrical connection of two components, wherein a first component has a first contact element, made from a conductive material and formed along a longitudinal axis and designed with an outer surface at least partially surrounding the longitudinal axis, and a second component has a second contact element made from a conductive material and is designed with a cavity formed along the longitudinal axis, whose inner surface corresponds to the outer surface of the first contact element, wherein either the inner surface of the second contact element or the outer surface of the first contact element is provided with a profile which has a plurality of projecting elements around a perimeter, wherein the inner surface and the outer surface are selected with respect to their lateral dimensions such that the projecting elements of the profile penetrate in an exterior area close to the surface during insertion of the first contact element into the second contact element, wherein the height of the projecting elements leads to a local bonding at the inner surface and the outer surface during the insertion.

2. A charging device, in particular in a vehicle, wherein the charging device (48) has:
　a compressor with a compressor housing (54) and a compressor chamber in which a compressor wheel (52) is arranged,
　an electric motor (56) with a motor housing which is connected via a shaft (50) to the compressor wheel (52),
　a power electronics switch (58) for controlling the electric motor (56) and arranged in an accommodation space adjacent to the motor housing, wherein an assembly (2) is provided for the electrical connection to the power electronics switch (58) and/or to the electric motor (56),
　wherein in the assembly (2) a first component (24) has a first contact element (4), made from a conductive material and formed along a longitudinal axis (6) and designed with an outer surface (8) at least partially surrounding the longitudinal axis (6), and a second component (30) has a second contact element (14) made from a conductive material and is designed with a cavity (18) formed along the longitudinal axis (6), whose inner surface (20) corresponds to the outer surface (8) of the first contact element (4), wherein either the inner surface (20) of the second contact element (14) or the outer surface (8) of the first contact element (4) is provided with a profile (22) which has a plurality of projecting elements around a perimeter, wherein the inner surface (20) and the outer surface (8) are selected with respect to their lateral dimensions such that the projecting elements of the profile (22) penetrate in an exterior area close to the surface during insertion of the first contact element (4) into the second contact element (14).

3. The assembly according to claim 2, wherein the profile (22) is arranged on the outer surface (8) of the first contact element (4).

4. The assembly according to claim 3, wherein the projecting elements of the profile (22) are designed as a regular toothing.

5. The assembly according to claim 4, wherein the toothing is generated by means of a cold-rolling process.

6. The assembly according to claim 2, wherein the first contact element (4) and the second contact element (14) are formed along the longitudinal axis (6) with a symmetrical cross section, in particular are formed with a cylindrical or rectangular cross section.

7. The assembly according to claim 2, wherein the area close to the surface is an oxide layer on the surface of one of the contact elements.

8. The assembly according to claim 2, wherein a guide pin (44) is additionally provided on a tip of the first contact element (4) or of the second contact element (14) in order to facilitate the insertion of the contact elements (4, 14), in that the guide pin (44) engages in a corresponding guide opening (46) on the other contact element.

9. The assembly according to claim 2, wherein the first contact element (4) is arranged in an insulator (26) in the first component (24).

10. The assembly according to claim 2, wherein multiple first contact elements (4, 4', 4") are provided in the first component (24).

11. The assembly according to claim 2, wherein the second contact element (14) is arranged in an insulator (32) in the second component (30).

12. The assembly according to claim 2, wherein multiple second contact elements (14, 14', 14") are provided in the second component (30).

13. The charging device according to claim 2, wherein the assembly (2) is provided for electrical connection within the power electronics switch (58).

14. The charging device according to claim 2, wherein the assembly (2) is provided for electrical connection between the power electronics switch (58) and the electric motor (56).

15. The charging device according to claim 2, which is used in an internal combustion engine or in a fuel cell.

* * * * *